Sept. 29, 1942.   A. BERGER   2,297,196
LIQUID CLUTCH
Filed March 11, 1938
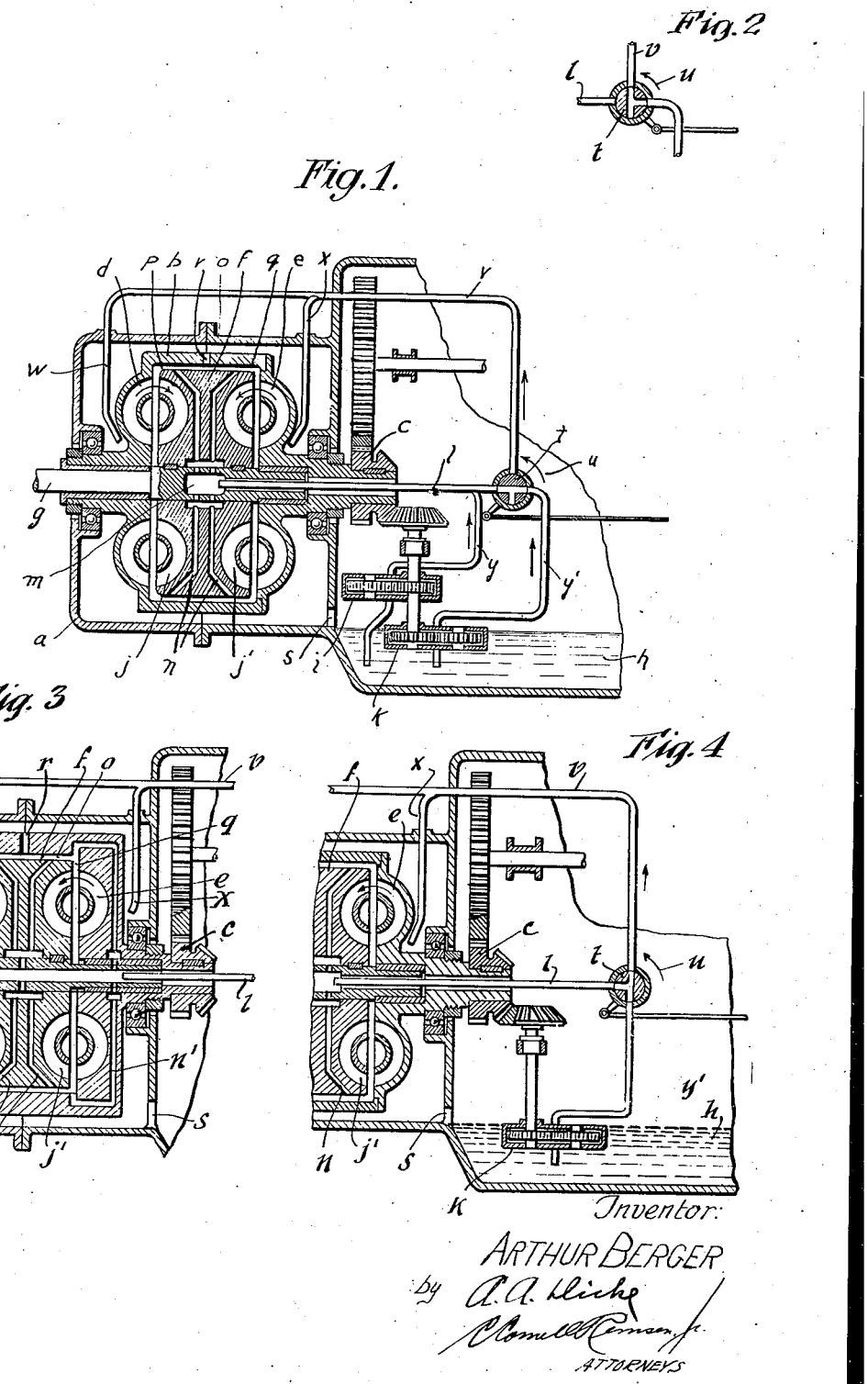
Inventor:
ARTHUR BERGER
by A. A. Wiche
C. Cornell Remsen Jr.
ATTORNEYS Patented Sept. 29, 1942

2,297,196

UNITED STATES PATENT OFFICE 2,297,196

LIQUID CLUTCH

Arthur Berger, Stuttgart - Oberturkheim, Germany; vested in the Alien Property Custodian Application March 11, 1938, Serial No. 195,218
In Germany March 11, 1937

15 Claims. (Cl. 60—54)

The invention relates to a fluid coupling, disposed in a fluid circuit and controllable by filling and emptying, and is a continuation-in-part of my co-pending application Serial No. 195,003, filed March 10, 1938, now United States Patent No. 2,223,715, issued December 3, 1940.

An important object of the invention is to provide a fluid coupling wherein the working fluid is employed for cooling the coupling by conducting it first to cooling passages and thereafter to the working space or spaces of the fluid coupling. Preferably, the working space or spaces of the fluid coupling are filled from the outer periphery of the coupling. For example, the fluid may be supplied to the coupling axially and then flow outwardly through the cooling passages before passing into the working spaces.

As compared with fluid couplings wherein the cooling passages are disposed parallel to the working spaces in the fluid flow, the invention possesses the advantage that the fluid flow is conducted positively through the cooling passages and consequently an effective and sufficient cooling is ensured in any event. Only after the fluid has flowed through the cooling passages, can it fill the working spaces of the fluid coupling.

A further object is to provide a coupling wherein that part of the fluid which may be diverted from the main circulation for the purpose of reducing the power-output of the coupling is employed for additional cooling of the coupling parts.

Embodiments of the invention by way of example are illustrated more or less diagrammatically in the drawing, wherein:

Figure 1 is a longitudinal sectional view showing a control valve in one operative position;

Figure 2 is a detail view showing the control valve in a second operative position;

Fig. 3 is a longitudinal sectional view similar to Fig. 1 illustrating a modified form of fluid coupling; and Fig. 4 is a partial longitudinal sectional view illustrating a further modification.

Mounted in the stationary housing $a$ is the outer drum-shaped coupling part $b$ of a fluid coupling (Föttinger construction) which is driven, for example, by an internal combustion engine (not shown) through a pinion $c$, for example at high speed. The outer coupling part or impeller $b$ drives the inner coupling part or turbine $f$, which is disposed fixedly upon the shaft $g$, in known manner by means of the liquid circulating in a working circuit formed by the turbine spaces $j, j'$ respectively of the inner coupling member $f$ cooperating with the impeller spaces $d, e$ of the outer coupling element $b$. The shaft $g$ drives, for example, a blower (not shown) for the charging of the internal combustion engine.

The working liquid, for example lubricating oil for the internal combustion engine, is supplied from the vessel $h$ by means of two gear-wheel pumps $i$ and $k$, which are connected in parallel and, for example, are disposed upon a common shaft driven from the internal combustion engine. These pumps supply oil to the passage or conduit $l$ which conducts the liquid into a hollow space $m$ in the shaft $g$, whence is passes into the passages or canals $n$ assisted by centrifugal action. These passages penetrate outwardly in a substantially radial direction, in as large a number as possible, the inner part $f$ of the fluid coupling so that a high cooling action is achieved. The liquid projected out from the passages $n$ collects in a larger annular space or slot $o$ which is in communication by openings $p$ and $q$ with the working spaces $d, e, j$ and $j'$ of the fluid coupling at their outer periphery. The liquid can issue through a throttled opening $r$ into the housing $a$ and can flow back therefrom into the vessel $h$ through a return passage $s$.

The pump $i$ is directly connected with the passages $l$ through the conduit $y$, while in the pressure passage of the pump $k$, there is a change-over cock $t$ connected therewith through conduit $y'$, which, in the position illustrated, opens communication between the pump $k$ and the passage $l$, but, upon being moved in the direction of the arrow $u$ to the position seen in Figure 2, cuts off this communication and conducts the liquid supplied by the pump $k$ to a passage conduit $v$ which opens into two separate passages or conduits $w, x$ carried as jet deliveries to points close to the outer clutch part $b$. The cock $t$ may be adjusted at will or automatically.

The manner of operation is obvious: In the position of the cock $t$ illustrated in Figure 1, the passage $l$ and, consequently, the coupling are supplied by both pumps $i$ and $k$. The liquid passes through the cooling passages $n$ into the outer annular space $o$, dams up in this, since it cannot flow away sufficiently rapidly through the throttle bore $r$, and fills the working spaces $d, e, j$ and $j'$, where it circulates in the direction of the arrows. In this case, the slip of the coupling is only slight.

After movement of the cock $t$ in the direction $u$ to the position seen in Figure 2, the coupling is supplied through the pump $i$ only. In this case, however, the quantity of liquid no longer suffices to maintain the filling of the working spaces $d$, $e$, $j$ and $j'$. The latter are therefore partially emptied. On the other hand, the cooling of the coupling is maintained, since all of the liquid supplied by the pump $i$ must flow through the passages $n$. At the same time, the liquid supplied by the pump $k$ and diverted by the cock $t$ is sprayed from the mouths of the passages $w$ and $x$ against the wall of the outer coupling part $b$, so that the coupling is cooled externally. By this means it is impossible for the coupling parts to run hot and heat up to red heat due to air friction in the interior of the partially empty working spaces.

The invention is not limited to the illustrative embodiment. For example, the outer coupling halves of the working spaces $d$ and $e$ might also be constantaly cooled in that the part $b$ may possess passages on the outer sides of the working spaces which, for example, are supplied with liquid, like the passages $n$ from the axis. Such an arrangement is shown in Fig. 3 wherein cooling canals $n^1$ are illustrated in the outer impeller elements $b$. In this case, the canals $n^1$ are fed from the hollow space $m$ in the shaft $g$ and discharge into the annular slot $o$, similarly to the canals $n$, previously described in connection with the inner turbine member $f$. In this case, it will be necessary to somewhat enlarge the outer impeller part $b$, along the lines illustrated.

Instead of being constructed as a double coupling, the liquid coupling may also be constructed as a simple coupling or in some other arrangement. The control of the supply of liquid may be effected in any desired fashion, for example, by a single pump only, in which case the quantity of liquid supplied by it may be diverted partially from the main circulation by a throttling or change-over member and employed for the cooling. Fig. 4 illustrates the use of such a single pump with the type of coupling illustrated in Fig. 1. In the position of the valve shown, liquid will be supplied to both conduits $l$ and $v$, and thus both interiorly and exteriorly of the coupling. If, however, the valve is turned in the direction of the arrow, the supply of liquid to the conduit $v$ will be cut off, and all of the pump liquid will be supplied through the conduit $l$ to the interior of the coupling.

I claim:

1. A fluid coupling for interconnecting a load and a source of power, comprising, in combination, an impeller element connected to the source of power, a turbine element cooperating with said impeller element to form a working circuit and connected to the load, canals extending through one of said elements and adapted to supply fluid to said working circuit and cool said one element, supplementary cooling conduits adapted to direct fluid against the outside of one of said elements, pump means for supplying said fluid, a feed conduit leading from said pump to said canals and cooling conduits, and a valve in said feed conduit movable between two positions, in one of which said pump means is connected to said combined working and cooling canals alone for low slip operation, and in the other to both said combined canals and supplementary cooling conduits for high slip operation.

2. A fluid coupling for interconnecting a load and a source of power, comprising, in combination, a rotatably supported inner member formed with outwardly directed blades, a rotatably supported outer member including a casing surrounding but radially spaced from said rotatably supported inner member, and formed with opposite inwardly directed blades cooperating with the respective blades of said inner member to form a pair of working circuits communicating with the annular space formed between said casing and said inner member, said inner member having internal radial canal connected at their outer ends with said annular space, means for supplying fluid to the inner ends of said canals, said casing having a throttle opening for removal of the excess fluid from said annular space, and means for connecting one of said members to the load and the other to the source of power.

3. A fluid coupling for interconnecting a load and a source of power, comprising, in combination, an impeller element connected to the source of power, a turbine element cooperating with said impeller element to form a working circuit and connected to the load, pump means for supplying working fluid to said working circuit, a cooling canal extending radially throughout one of said elements for discharge outside of but in communication with said working circuit, a cooling conduit having one end directing cooling fluid against the outside of the other of said elements, and a valve interconnecting both said canal and said conduit with said pump means, said valve being movable between two positions, in one of which said pump means is connected to said working circuit alone through said cooling canal, and in the other to both said working circuit through said cooling canal and to said cooling conduit.

4. A fluid coupling for interconnecting a load and a source of power, comprising, in combination, an impeller element connected to the source of power, a turbine element cooperating with said impeller element to form a working circuit and connected to the load, one of said elements being formed with an internal canal extending radially throughout the same and discharging outside of but in communication with said working circuit, means for supplying fluid to the other end of said radial canal including a pump, a cooling conduit having one end directed against the outside of said impeller element, and a valve interconnecting said radial canal and cooling conduit with said pump, said valve being movable between two positions, in one of which said pump is connected to said radial canal alone for low slip operation, and in the other to both said radial canal and cooling conduit for high slip operation.

5. A fluid coupling for interconnecting a load and a source of power, comprising, in combination, a rotatably supported inner member formed with outwardly directed blades, and having internal radial canals, a rotatably supported outer member including a casing surrounding said rotatably supported inner member, and formed with opposite inwardly directed blades cooperating with the respective blades of said inner member to form a pair of working circuits spaced from but communicating with the outer ends of said radial canals, pump means for supplying fluid to the inner ends of said radial canals, said casing having a throttle opening for removal of the excess fluid, means for connecting one of said members to the load and the other to the source of power, a plurality of cooling conduits having one of their ends directing cooling fluid against the opposite outer sides of said outer member, and a valve interconnecting said radial canals and cooling conduits with said pump means, said valve being movable between two positions, in one of which said pump means is connected to said radial canals alone for low slip operation, and in the other to both said radial canals and cooling conduits for high slip operation.

6. A fluid coupling system for interconnecting a load and a source of power, comprising, in combination, an impeller element connected with the source of power, a turbine element cooperating with said impeller element to form a working circuit and connected to the load, one of said elements being formed with an internal radial canal having one end communicating with said working circuit, a cooling conduit having one end directing cooling fluid against the outside surface of the other of said elements, a pair of pumps driven by said source of power, means for interconnecting one of said pumps with the other end of said radial canal, and valve means movable between two extreme positions for connecting the other pump with the said other end of said radial canal for low slip operation, or with the other end of said cooling conduit for high slip operation.

7. A fluid coupling for interconnecting a load and a source of power, comprising, in combination, an impeller element connected to the source of power, a turbine element cooperating with said impeller element to form a working circuit and connected to the load, and means for supplying working fluid to said working circuit, said means including cooling canals extending radially from the inside toward the outside throughout both of said elements for discharge radially outside of but in communication with said working circuit.

8. The combination according to claim 2, in which said outer member is formed with internal radial canals communicating at their outer ends with said annular space, and at their inner ends being interconnected with said fluid supply means.

9. The combination according to claim 2, in combination with cooling conduits for directing fluid against the opposite outer sides of said outer member, and in which said fluid supply means includes means for decreasing the supply of fluid to said internal radial canals and simultaneously increasing the supply of fluid to said cooling conduits, and vice versa.

10. A fluid coupling comprising rotatably mounted driving and driven coupling parts forming longitudinally between them the walls of a working space and radially between them an annularly shaped open slot, said slot being positioned radially outwardly from and about said working space and in communication therewith, a canal extending through one of said walls and discharging at one end into said slot, and means for supplying coupling fluid to the other end of said canal, whereby said fluid must first traverse said canal for cooling said wall before it enters into said slot and thence directly to said working space, and means for permitting removal of any extra fluid from said slot.

11. The combination according to claim 10, in which said last means is formed as a throttling bore in one of said parts, into which the excess fluid is discharged toward the outside by centrifugal force.

12. The combination according to claim 10, in which the means for supplying fluid to the other end of said canal includes a hollow shaft for one of said parts, the interior of which is in communication with said canal.

13. A fluid coupling comprising an inner coupling part and an outer coupling part surrounding the inner coupling part upon both its sides and about its circumference to form therewith a pair of longitudinally spaced working spaces surrounded by a radially spaced annularly shaped slot between said two coupling parts in communication with both working spaces and directly connected to the same, the inner coupling part being formed with a pair of substantially radial canals communicating at their outer ends with said slot, means for supplying coupling fluid to the other ends of said canals, whereby said fluid first traverses the canals for cooling the coupling, flows into said slot and from thence immediately into the working spaces, and means for carrying off excess fluid from said working spaces.

14. The combination according to claim 13, in which said last means comprises a throttling bore in the outer coupling part, communicating with said annular slot.

15. In a fluid coupling having driving and driven coupling parts forming a working space between them, one of said parts being formed with outwardly discharging canals leading to said working space and extending radially throughout said one part, a source of coupling fluid, a conduit for guiding said fluid from said source to said canals, and means in said conduit diverting the fluid from said canals to effect a partial emptying of the working space, and means for directing the diverted fluid against the outside of the coupling for cooling the same during said diversion and partial emptying.

ARTHUR BERGER.